US011987771B2

(12) United States Patent
Burgess et al.

(10) Patent No.: US 11,987,771 B2
(45) Date of Patent: May 21, 2024

(54) FABRIC SPRAY COMPOSITION COMPRISING A NON-FUNCTIONALIZED SILICONE NANOEMULSION AND PEG-40 HYDROGENATED CASTOR OIL

(71) Applicant: Conopco, Inc., Englewood Cliffs, NJ (US)

(72) Inventors: Karl Burgess, Prenton (GB); David Christopher Sayle, Port Sunlight (GB)

(73) Assignee: Conopco, Inc., Englewood Cliffs, NJ (US)

( * ) Notice: Subject to any disclaimer, the term of this patent is extended or adjusted under 35 U.S.C. 154(b) by 955 days.

(21) Appl. No.: 16/755,411

(22) PCT Filed: Oct. 2, 2018

(86) PCT No.: PCT/EP2018/076841

§ 371 (c)(1),
(2) Date: Apr. 10, 2020

(87) PCT Pub. No.: WO2019/072648

PCT Pub. Date: Apr. 18, 2019

(65) Prior Publication Data

US 2020/0270805 A1 Aug. 27, 2020

(30) Foreign Application Priority Data

Oct. 13, 2017 (EP) .................................... 17196284
Oct. 13, 2017 (EP) .................................... 17196289
Jul. 6, 2018 (EP) .................................... 18182204

(51) Int. Cl.
*C11D 1/66* (2006.01)
*C11D 3/37* (2006.01)
*C11D 3/50* (2006.01)

(52) U.S. Cl.
CPC ................ *C11D 3/50* (2013.01); *C11D 3/373* (2013.01); *C11D 2111/12* (2024.01)

(58) Field of Classification Search
CPC ... C11D 17/0043; C11D 1/66; C11D 17/0021; C11D 3/50; C11D 9/44; C11D 2111/12
See application file for complete search history.

(56) References Cited

U.S. PATENT DOCUMENTS 4,917,303 A 4/1990 Maas
4,991,778 A 2/1991 Maas et al.
5,111,971 A 5/1992 Winer
5,234,166 A 8/1993 Foster et al.
5,294,025 A 3/1994 Foster
5,397,060 A 3/1995 Maas et al.
5,534,165 A 7/1996 Pilosof et al.
5,626,259 A 5/1997 Maas et al.
5,730,006 A 3/1998 Conley
5,783,541 A 7/1998 Tack
5,789,368 A 8/1998 You et al.
5,942,217 A 8/1999 Woo et al.
5,955,093 A 9/1999 Woo
5,968,404 A 10/1999 Trinh
5,997,759 A 12/1999 Trinh
6,001,343 A * 12/1999 Trinh ...................... A61L 9/145 424/76.8
6,033,679 A 3/2000 Woo et al.
6,194,470 B1 2/2001 Lutz et al.
6,416,558 B1 7/2002 Ona et al.
6,446,882 B1 9/2002 Dukes
6,491,840 B1 10/2002 Frankenbach et al.
6,495,058 B1 12/2002 Frankenbach et al.
6,528,013 B1 4/2003 Trinh et al.
6,602,494 B1 * 8/2003 Jahedshoar ............ A61K 8/898 424/70.28
6,645,392 B2 11/2003 Frankenbach et al.
7,012,053 B1 * 3/2006 Barnabas ............... C11D 3/221 510/276
7,341,674 B1 * 3/2008 Trinh .................... D06M 15/19 106/18.32
9,243,213 B1 1/2016 Vetter et al.
9,365,803 B2 6/2016 Vetter et al.
9,610,239 B2 4/2017 Feng et al.
11,649,416 B2 * 5/2023 Boardman ............... C11D 3/50 427/427.4
2002/0010104 A1 * 1/2002 Ewbank ............. C11D 17/0021 510/515
2002/0011584 A1 * 1/2002 Uchiyama .............. C11D 3/222 252/8.61
2002/0115581 A1 8/2002 DuVal
2002/0115584 A1 8/2002 Ongena
(Continued)

FOREIGN PATENT DOCUMENTS

BR 102015027601 5/2017
CN 1195266 10/1998
(Continued)

OTHER PUBLICATIONS

IPRP2 in PCTEP2018082740; Feb. 12, 2020.
Unilever PLC; Water-Soluble Package, Application No. EP15180624.7, filed Aug. 11, 2015; Water-Soluble Package, Application No. EP15180624.7, filed Aug. 11, 2015; Aug. 11, 2015; 18 pages.
X; Regulation No. 348/2004 of the European Parliament and of the Council; 2004RO648-EN-01.06.2015-007.001; Mar. 31, 2004; pp. 1-54.
X; Regulation No. 1272/2008 of the European Parliament and of the Council; L 353; Dec. 16, 2008; pp. 1-14.
X; Regulation No. 1297/2014 of the European Parliament and of the Council; L 350; Dec. 5, 2014; pp. 1-4; x.
X; Technical Report 191220 LAS02720EP-IX01; x; x; x; x.
(Continued)

*Primary Examiner* — Charles I Boyer
(74) *Attorney, Agent, or Firm* — Carter, DeLuca & Farrell LLP; George Likourezos; Bret P. Shapiro

(57) ABSTRACT

An aqueous fabric spray composition comprising: a. 0.5 to 2 w.t. % non-functionalised silicone, wherein the silicone is in the form of an emulsion, the emulsion having a particle size of 1 nm to 300 nm b. Free perfume having a particle size of 1 nm to 30 um.

11 Claims, 4 Drawing Sheets

(56) References Cited

U.S. PATENT DOCUMENTS

| | | | | |
|---|---|---|---|---|
| 2002/0148994 | A1 | 10/2002 | McGee | |
| 2002/0165109 | A1 | 11/2002 | Cropper et al. | |
| 2003/0035748 | A1 | 2/2003 | Trinh et al. | |
| 2003/0068375 | A1 | 4/2003 | Wright et al. | |
| 2003/0071075 | A1 | 4/2003 | Frankenbach et al. | |
| 2003/0098368 | A1 | 5/2003 | Foster | |
| 2003/0100461 | A1 | 5/2003 | Catlin | |
| 2003/0100463 | A1 | 5/2003 | Delamarche | |
| 2003/0146405 | A1 | 8/2003 | Frankenbach et al. | |
| 2003/0201339 | A1 | 10/2003 | Foster et al. | |
| 2003/0209686 | A1 | 11/2003 | Frankenbach et al. | |
| 2003/0215417 | A1 | 11/2003 | Uchiyama et al. | |
| 2003/0216488 | A1 | 11/2003 | Uchiyama et al. | |
| 2004/0053810 | A1 | 3/2004 | Tully et al. | |
| 2004/0076595 | A1* | 4/2004 | Khan | B82Y 5/00 424/70.28 |
| 2004/0127463 | A1 | 7/2004 | Trinh | |
| 2004/0149837 | A1 | 8/2004 | Foster | |
| 2005/0089540 | A1 | 4/2005 | Uchiyama et al. | |
| 2005/0113282 | A1 | 5/2005 | Parekh et al. | |
| 2006/0003913 | A1 | 1/2006 | Boutique et al. | |
| 2006/0110349 | A1* | 5/2006 | Gallagher | A61K 8/046 424/70.22 |
| 2008/0245821 | A1 | 10/2008 | Itzkowitz et al. | |
| 2009/0050838 | A1 | 2/2009 | Doneva et al. | |
| 2009/0178211 | A1 | 7/2009 | Wahl et al. | |
| 2009/0178212 | A1 | 7/2009 | Wahl et al. | |
| 2010/0098644 | A1 | 4/2010 | Vlad et al. | |
| 2010/0135918 | A1* | 6/2010 | Kim | A61K 8/8158 424/47 |
| 2010/0192311 | A1 | 8/2010 | Magennis et al. | |
| 2011/0186467 | A1 | 8/2011 | Denome | |
| 2011/0201537 | A1* | 8/2011 | Ponder | C11D 3/2093 510/516 |
| 2011/0272494 | A1 | 11/2011 | Richardson et al. | |
| 2011/0275553 | A1 | 11/2011 | Leopold et al. | |
| 2011/0305659 | A1* | 12/2011 | Woo | D06M 13/12 424/76.1 |
| 2012/0181305 | A1 | 7/2012 | West et al. | |
| 2012/0183605 | A1 | 7/2012 | Arnold et al. | |
| 2013/0139327 | A1 | 6/2013 | Sieben et al. | |
| 2013/0273277 | A1 | 10/2013 | Lee et al. | |
| 2013/0306757 | A1 | 11/2013 | Parmentier | |
| 2013/0306767 | A1 | 11/2013 | Becker et al. | |
| 2014/0189962 | A1 | 7/2014 | Tovar Pescador et al. | |
| 2015/0158645 | A1 | 6/2015 | Meier et al. | |
| 2015/0158646 | A1 | 6/2015 | Meier et al. | |
| 2015/0252305 | A1 | 9/2015 | Souter | |
| 2015/0252306 | A1 | 9/2015 | Souter | |
| 2015/0292141 | A1 | 10/2015 | Behr | |
| 2016/0024435 | A1 | 1/2016 | Vetter et al. | |
| 2016/0108339 | A1 | 4/2016 | Feng et al. | |
| 2016/0215238 | A1 | 7/2016 | Vetter et al. | |
| 2016/0220462 | A1* | 8/2016 | Rose | A61K 8/891 |
| 2017/0001208 | A1 | 1/2017 | Barenhoff et al. | |
| 2017/0015948 | A1* | 1/2017 | Johnson | C11D 3/001 |
| 2017/0066999 | A1 | 3/2017 | Brandt-Sanz | |
| 2017/0067000 | A1 | 3/2017 | Brandt-Sanz | |
| 2017/0137750 | A1* | 5/2017 | Zhang | C11D 11/0094 |
| 2018/0258370 | A1* | 9/2018 | Solinas | A61K 8/347 |

FOREIGN PATENT DOCUMENTS

| | | | |
|---|---|---|---|
| CN | 1278033 | | 12/2000 |
| CN | 1332787 | | 1/2002 |
| CN | 1384895 | | 11/2002 |
| CN | 1498137 | | 5/2004 |
| CN | 1631549 | | 6/2005 |
| CN | 101104463 | | 1/2008 |
| CN | 101142357 | | 3/2008 |
| CN | 101146724 | | 3/2008 |
| CN | 101802293 | | 8/2010 |
| CN | 102260604 | | 11/2011 |
| CN | 103748204 | | 4/2014 |
| CN | 104582859 | | 4/2015 |
| CN | 104661646 | | 5/2015 |
| CN | 106661514 | | 5/2017 |
| CN | 106164358 | | 5/2018 |
| CN | 106574214 | | 4/2020 |
| EP | 0988365 | | 5/2005 |
| EP | 988364 | | 8/2005 |
| EP | 2196531 | | 6/2010 |
| EP | 2216394 | | 11/2010 |
| EP | 2196531 | | 9/2014 |
| EP | 2933101 | | 10/2015 |
| ES | 2016450 | | 11/1990 |
| GB | 2270930 | A | 3/1994 |
| JP | 1029438 | | 1/1989 |
| JP | 2000063204 | | 2/2000 |
| NZ | 228775 | | 10/1990 |
| WO | WO9608555 | | 3/1996 |
| WO | WO9856888 | | 12/1998 |
| WO | WO9856890 | | 12/1998 |
| WO | WO9955814 | | 11/1999 |
| WO | WO9955815 | | 11/1999 |
| WO | WO9955952 | | 11/1999 |
| WO | WO9955953 | | 11/1999 |
| WO | WO0001421 | | 1/2000 |
| WO | WO0024856 | | 5/2000 |
| WO | WO0107561 | | 1/2001 |
| WO | WO0116266 | | 3/2001 |
| WO | WO0131113 | | 5/2001 |
| WO | WO2001061100 | | 8/2001 |
| WO | WO0215663 | | 2/2002 |
| WO | WO0226896 | | 4/2002 |
| WO | WO0240623 | | 5/2002 |
| WO | WO02076624 | | 10/2002 |
| WO | WO03025108 | | 3/2003 |
| WO | WO03057813 | | 3/2003 |
| WO | WO03045813 | | 6/2003 |
| WO | WO03089561 | | 10/2003 |
| WO | WO2005025626 | | 3/2005 |
| WO | WO2008034594 | | 3/2008 |
| WO | WO2008073299 | | 6/2008 |
| WO | WO2009036277 | | 3/2009 |
| WO | WO2011009100 | | 1/2011 |
| WO | WO2013158364 | | 10/2013 |
| WO | WO14003180 | | 1/2014 |
| WO | WO2014016144 | | 1/2014 |
| WO | WO2014026855 | | 2/2014 |
| WO | WO2014026856 | | 2/2014 |
| WO | WO2015117625 | | 8/2015 |
| WO | WO2015134829 | | 9/2015 |
| WO | WO2017025426 | | 2/2017 |
| WO | WO2018024511 | | 2/2018 |
| WO | WO2018024798 | | 2/2018 |
| WO | 2019072646 | A1 | 4/2019 |
| WO | WO2000024851 | | 5/2020 |

OTHER PUBLICATIONS

Ghasem et al.; Background on Sprays and Their Production ; Industrial Sprays and Atomization Design Analysis and Applications; 2002; pp. 7-33; XP009195118; Chapter 2; Springer.

Search Report and Written Opinion in PCTEP2018076841; Dec. 10, 2018.

Search Report and Written Opinion in PCTEP2018076839.

Search Report and Written Opinion in PCTEP2018076836; Dec. 7, 2018.

Search Report and Written Opinion in EP17204518; Jun. 11, 2018.

Search Report and Written Opinion in PCTEP2018076838; Dec. 10, 2018.

Search Report and Written Opinion in EP17196289; Mar. 27, 2018.

Search Report and Written Opinion in EP17196284; Mar. 27, 2018.

Search Report and Written Opinion in PCTEP2018076838; Dec. 8, 2018.

Search Report and Written Opinion in PCTEP2018082740.; Jan. 29, 2019.

Search Report and Written Opinion in PCTEP2018082741.; Jan. 30, 2019.

(56) References Cited

OTHER PUBLICATIONS

Search Report and Written Opinion in PCTEP2018076840; Dec. 10, 2018.
Search Report and Written Opinion in EP1796275; Apr. 19, 2018.
Search Report and Written Opinion in PCTEP2017069580; Nov. 16, 2017.
Search Report and Written Opinion in EP17196293; Mar. 22, 2018, TS800 Trigger Sprayers; TS800 Trigger Sprayers Mead Westvaco Corporation; Nov. 2013; Retrieved from the Internet: https://www.westrock.com/en/-/media/pdf/dispensers/one-pager/ts800onepagerl 1 2013.pdf Retrieved on Feb. 16, 2017 pp. 1-2 XP002767423.
Search Report and Written Opinion in EP16193715; Mar. 17, 2017.
Search Report and Written Opinion in PCTEP2017068512; Oct. 5, 2017.
Search Report and Written Opinion in EP17204524.
Written Opinion 2 in PCTEP2018076836; Aug. 23, 2019.
IPRP in PCT/EP2018/076836; IPRP in PCT/EP2018/076836; Jan. 7, 2020.
IPRP in PCTEP2018076841; Jan. 24, 2020.
Search Report and Written Opinion in 18175375.
Search Report and Written Opinion in PCTEP2016068639; Oct. 5, 2016.
Search Report and Written Opinion in EP16183128; Feb. 13, 2017.
Search Report & Written Opinion in PCTEP2016066043; Sep. 14, 2016.
Search Report and Written Opinion in EP15180618; Mar. 1, 2016.
Search Report and Written Opinion in EP15180621; Feb. 1, 2016.
Search Report and Written Opinion in EP15180622; Feb. 1, 2016.
Search Report and Written Opinion in EP15180624 ; Jan. 22, 2016.
Search Report and Written Opinion in PCTEP2016066036; Sep. 8, 2016.
Liao Wensheng, English Translation of Exhibit 1: "Liquid Detergents, New Raw Materials and New Formulations", p. 128, Chemical Industry Press, Jan. 2001 (4 pages).
"Milk and Dairy Product Engineering Technology"; Jan. 2016; 192; China Light Industry Press.
Wu Weixiong et al.; "Usage and Maintenance of Modern Agricultural Plant Protection Machinery"; 2010; 51-52; Atomic Energy Press.
IPRP2 in PCTEP2018082741; Feb. 7, 2020.

* cited by examiner

FABRIC SPRAY COMPOSITION COMPRISING A NON-FUNCTIONALIZED SILICONE NANOEMULSION AND PEG-40 HYDROGENATED CASTOR OIL

RELATED APPLICATIONS

This application is a national phase filing under 35 USC 371 of International Application No. PCT/EP2018/076841, filed on Oct. 2, 2018, which claims priority from European Patent Application Nos. 17196284.8, filed Oct. 13, 2017, 17196289.7, filed Oct. 13, 2017, and 18182204.0, filed Jul. 6, 2018, the contents of which are incorporated herein in their entirety for all purposes.

FIELD OF THE INVENTION

The present invention relates to fabric sprays.

BACKGROUND OF THE INVENTION

It is widely appreciated that washing clothes can cause damage over multiple washes. For example, colours fade, pilling occurs, clothes can tend to lose their shape and generally look aged. With increasing awareness of both the environmental concerns related to washing clothes and the waste in throwing clothes away after limited wear, consumers are looking for new products to refresh and rejuvenate their clothes.

There is a need for products which refresh and rejuvenate clothes without causing any damage to the clothes.

SUMMARY OF THE INVENTION

In a first aspect of the present invention, there is provided an aqueous fabric spray composition comprising:

a. 0.5 to 2 w.t. % non-functionalised silicone, wherein the silicone is in the form of an emulsion, the emulsion having a particle size of 1 nm to 300 nm b. Free perfume having a particle size of 1 nm to 30 um In a second aspect of the present invention, there is provided a fabric spray product comprising:

a. An aqueous fabric spray composition, the fabric spray composition comprising:
    i. 0.5 to 2 w.t. % non-functionalised silicone, b. A hand-held spray device, which is manually operable to produce a spray of the fabric spray composition, the hand-held spray device comprising:
    i. a reservoir containing the fabric spray composition and;
    ii. a spray mechanism, the spray mechanism being manually operable to discharge the fabric spray composition wherein said spray mechanism comprises a nozzle, the nozzle having a discharge orifice which is configured to produce a spray having a cone angle in the range of 50 to 100 degrees and/or a spray which comprises droplets having an average diameter in the range of 20 to 200 μm.

In a third aspect of the present invention, there is provided a method of refreshing fabric, comprising the step of spraying the aqueous fabric spray composition according to claims 1-5 or the fabric spray product according to claims 6-13 onto fabric or clothes. In a fourth aspect of the present invention, there is provided a use of the aqueous fabric spray composition according to claims 1-5 or the fabric spray product according to claims 6-13 to rejuvenate or refresh clothes.

DETAILED DESCRIPTION OF THE INVENTION

These and other aspects, features and advantages will become apparent to those of ordinary skill in the art from a reading of the following detailed description and the appended claims. For the avoidance of doubt, any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

Aqueous Compositions

The fabric spray compositions of the present invention are aqueous fabric sprays. Preferably at least 60 w.t. % of the composition is water, more preferably at least 70 w.t. %.

Silicone

The fabric spray compositions of the present invention comprise non-functionalised silicones. Non-functionalised silicones provide colour stability to spray compositions of the present invention.

Silicone may be present at a level selected from: less than 2%, less than 1.75%, and less than 1.6%, by weight of the spray composition. Silicone may be present at a level selected from: more than 0.5%, more than 0.7%, and more than 0.8%, by weight of the spray composition. Suitably silicone is present in the spray composition in an amount selected from the range of from about 0.5% to about 2%, preferably from about 0.7% to about 1.75%, more preferably from about 0.8% to about 1.6%, by weight of the spray composition.

Silicones and their chemistry are described in, for example in The Encyclopaedia of Polymer Science, volume 11, p 765.

Suitable non-functionalised silicones have the general formula:

$$R^1\text{—}Si(R^3)_2\text{—}O\text{—}[\text{—}Si(R^3)_2\text{—}O\text{—}]_x\text{—}Si(R^3)2\text{-}R^2$$

R1=hydrogen, methyl, methoxy, ethoxy, hydroxy, propoxy, and aryloxy group.

R2=hydrogen, methyl, methoxy, ethoxy, hydroxy, propoxy, and aryloxy group.

R3=alkyl, aryl, hydroxy, or hydroxyalkyl group, and mixtures thereof.

X=greater than 1, preferably 2 to 10 000, more preferably 10 to 5 000

A preferred non-functionalised silicone is polydimethylsiloxane (PDMS) polymer, which has the general formula:

$$R^1\text{—}Si(CH_3)_2\text{—}O\text{—}[\text{—}Si(CH_3)_2\text{—}O\text{—}]_x\text{—}Si(CH_3)_2\text{—}R^2$$

R1=hydrogen, methyl, methoxy, ethoxy, hydroxy, propoxy, and aryloxy group.

R2=hydrogen, methyl, methoxy, ethoxy, hydroxy, propoxy, and aryloxy group.

X=greater than 1, preferably 2 to 10 000, more preferably 10 to 5 000

The molecular weight of the silicone polymer is preferably from 1,000 to 500,000, more preferably from 2,000 to 250,000 even more preferably from 5,000 to 200,000.

The silicone of the present invention is preferably in the form of an emulsion. Silicones are preferably emulsified prior to addition to the present compositions. Silicone compositions are generally supplied from manufacturers in the form of emulsions.

The average particle size of the silicone emulsion may be less than, 300 nm, more preferably less than 250 nm and most preferably less than 200 nm. The average particle size may be more than 1 nm, preferably greater than 60 nm. The particle size is measured as a volume mean diameter, D[4,3], this can be measured using a Malvern Mastersizer 2000 from Malvern instruments. The particle size of the silicone emulsion will provide reduced straining of the fabric.

Examples of suitable silicones are Wacker E10 silicone fluid, and Wacker E 1044 silicone fluid.

Free Perfume

The fabric spray compositions of the present invention preferably comprise free perfume.

Free perfume may be present at a level selected from: less than 10%, less than 8%, and less than 5%, by weight of the spray composition. Free perfume may be present at a level selected from: more than 0.0001%, more than 0.001%, and more than 0.01%, by weight of the spray composition. Suitably free perfume is present in the spray composition in an amount selected from the range of from about 0.0001% to about 10%, preferably from about 0.001% to about 8%, more preferably from about 0.01% to about 5%, by weight of the garment refreshing composition.

Useful perfume components may include materials of both natural and synthetic origin. They include single compounds and mixtures. Specific examples of such components may be found in the current literature, e.g., in Fenaroli's Handbook of Flavor Ingredients, 1975, CRC Press; Synthetic Food Adjuncts, 1947 by M. B. Jacobs, edited by Van Nostrand; or Perfume and Flavor Chemicals by S. Arctander 1969, Montclair, N. J. (USA). These substances are well known to the person skilled in the art of perfuming, flavouring, and/or aromatizing consumer products.

A wide variety of chemicals are known for perfume use, including materials such as aldehydes, ketones, esters and the like. More commonly, naturally occurring plant and animal oils and exudates comprising complex mixtures of various chemical components are known for use as perfume, and such materials can be used herein. Typical perfumes can comprise e.g. woody/earthy bases containing exotic materials such as sandalwood oil, civet and patchouli oil. The perfume also can be of a light floral fragrance e.g. rose or violet extract. Further the perfume can be formulated to provide desirable fruity odours e.g. lime, lemon or orange.

Particular examples of useful perfume components and compositions are anetole, benzaldehyde, benzyl acetate, benzyl alcohol, benzyl formate, iso-bornyl acetate, camphene, cis-citral (neral), citronellal, citronellol, citronellyl acetate, paracymene, decanal, dihydrolinalool, dihydromyrcenol, dimethyl phenyl carbinol, eucalyptol, geranial, geraniol, geranyl acetate, geranyl nitrile, cis-3-hexenyl acetate, hydroxycitronellal, d-limonene, linalool, linalool oxide, linalyl acetate, linalyl propionate, methyl anthranilate, alpha-methyl ionone, methyl nonyl acetaldehyde, methyl phenyl carbinyl acetate, laevo-menthyl acetate, menthone, iso-menthone, myrcene, myrcenyl acetate, myrcenol, nerol, neryl acetate, nonyl acetate, phenyl ethyl alcohol, alpha-pinene, beta-pinene, gamma-terpinene, alpha-terpineol, beta-terpineol, terpinyl acetate, vertenex (para-tertiary-butyl cyclohexyl acetate), amyl cinnamic aldehyde, iso-amyl salicylate, beta-caryophyllene, cedrene, cinnamic alcohol, couramin, dimethyl benzyl carbinyl acetate, ethyl vanillin, eugenol, iso-eugenol, flor acetate, heliotrophine, 3-cis-hexenyl salicylate, hexyl salicylate, lilial (para-tertiarybutyl-alpha-methyl hydrocinnamic aldehyde), gamma-methyl ionone, nerolidol, patchouli alcohol, phenyl hexanol, beta-selinene, trichloromethyl phenyl carbinyl acetate, triethyl citrate, vanillin, veratraldehyde, alpha-cedrene, beta-cedrene, C15H24sesquiterpenes, benzophenone, benzyl salicylate, ethylene brassylate, galaxolide (1,3,4,6,7,8-hexahydro-4,6,6,7,8,8,-hexamethyl-cyclo-penta-gamma-2-benzopyran), hexyl cinnamic aldehyde, lyral (4-(4-hydroxy-4-methyl pentyl)-3-cyclohexene-10-carboxaldehyde), methyl cedrylone, methyl dihydro jasmonate, methyl-beta-naphthyl ketone, musk ambrette, musk idanone, musk ketone, musk tibetine, musk xylol, aurantiol and phenylethyl phenyl acetate.

It is preferred that the free oil perfume may comprise phenolic aldehyde components. Preferably it comprises 0.5 to 15 w.t. % phenolic aldehyde components, more preferably, 1 to 12 w.t %, most preferably 1 to 10 w.t. % phenolic aldehyde components. Preferred phenolic aldehyde components include vanillin, derivatives of vanillin, ethyl vanillin and derivatives of ethyl vanillin. Most preferably, the phenolic aldehyde components are vanillin and ethylvanillin. Non-functionalised silicones are particularly preferred to stabilise phenolic aldehyde components.

The free perfume compositions of the present compositions comprise blooming perfume ingredients. Blooming perfume components are defined by a boiling point less than 250° C. and a Log P or greater than 2.5. Preferably the free perfume compositions of the present invention comprise at least 10 w.t. % blooming perfume ingredients, more preferably at least 20 w.t. % blooming perfume ingredients, most preferably at least 25 w.t. % blooming perfume ingredients. Preferably the free perfume compositions of the present comprise less than 58 w.t. % blooming perfume ingredients, more preferably less than 50 w.t. % blooming perfume ingredients, most preferably less than 45 w.t. % blooming perfume ingredients. Suitably the free perfume compositions of the present compositions comprise 10 to 58 w.t. % blooming perfume ingredients, preferably 20 to 50 w.t. % blooming perfume ingredients, more preferably 25 to 45 w.t. % blooming perfume ingredients.

Examples of suitable blooming perfume ingredient include: Allo-ocimene, Allyl heptanoate, trans-Anethole, Benzyl butyrate, Camphene, Carvacrol, cis-3-Hexenyl tiglate, Citronellol, Citronellyl acetate, Citronellyl nitrile, Cyclohexylethyl acetate, Decyl Aldehyde (Capraldehyde), Dihydromyrcenol, Dihydromyrcenyl acetate, 3,7-Dimethyl-1-octanol, Fenchyl Acetate, Geranyl acetate, Geranyl formate, Geranyl nitrile, cis-3-Hexenyl isobutyrate, Hexyl Neopentanoate, Hexyl tiglate, alpha-Ionone, Isobornyl acetate, Isobutyl benzoate, Isononyl acetate, Isononyl alcohol, Isopulegyl acetate, Lauraldehyde, Linalyl acetate, Lorysia, D-limonene, Lymolene, (−)-L-Menthyl acetate, Methyl Chavicol (Estragole), Methyl n-nonly acetaldehyde, Methyl octyl acetaldehyde, Beta-Myrcene, Neryl acetate, Nonyl acetate, Nonaldehyde, Para-Cymene, alpha-Pinene, beta-Pinene, alpha-Terpinene, gamma-Terpinene, Terpineolene, alpha-Terpinyl acetate, Tetrahydrolinalool, Tetrahydromyrcenol, 2-Undecenal, Verdox (o-t-Butylcyclohexyl acetate), and Vertenex(4-tert.Butylcyclohexyl acetate).

Other useful perfume ingredients include substantive perfume components. Substantive perfume components are defined by a boiling point greater than 250° C. and a Log P greater than 2.5. Preferably the free perfume composition further comprises substantive perfume ingredients.

Boiling point is measured at standard pressure (760 mm Hg). Preferably a perfume composition will comprise a mixture of blooming and substantive perfume components. The perfume composition may comprise other perfume components.

The log P of many perfume ingredients have been reported; for example, the Pomona92 database, available from Daylight Chemical Information Systems, Inc. (Daylight CIS), Irvine, Calif., contains many, along with citations to the original literature. However, the log P values are most conveniently calculated by the "C LOG P" program, also available from Daylight CIS. This program also lists experimental log P values when they are available in the Pomona92 database. The "calculated log p" (C log P) is determined by the fragment approach of Hansch and Leo (cf., A Leo, in Comprehensive Medicinal Chemistry, Vol. 4, C. Hansch, P. G. Sammens, J. B. Taylor and C. A. Ramsden, Eds., p. 295, Pergamon Press, 1990, incorporated herein by reference). The fragment approach is based on the chemical structure of each perfume ingredient, and takes into account the numbers and types of atoms, the atom connectivity, and chemical bonding.

The C log P values, which are the most reliable and widely used estimates for this physicochemical property, are used instead of the experimental log P values in the selection of perfume ingredients herein.

It is commonplace for a plurality of perfume components to be present in a free oil perfume composition. In the compositions for use in the present invention it is envisaged that there will be three or more, preferably four or more, more preferably five or more, most preferably six or more different perfume components. An upper limit of 300 perfume components may be applied.

The free perfume of the present invention is in the form of an emulsion. The particle size of the emulsion can be in the range from about 1 nm to 30 microns and preferably from about 100 nm to about 20 microns. The particle size is measured as a volume mean diameter, D[4,3], this can be measured using a Malvern Mastersizer 2000 from Malvern instruments.

Without wishing to be bound by theory, it is believed that the free perfumes of this emulsion particle size will interact with the silicone emulsion to provide improved perfume longevity on the items being sprayed.

Free oil perfume forms an emulsion in the present compositions. The emulsions may be formed outside of the composition or in situ. When formed in situ, at least one emulsifier is preferably added with the free oil perfume to stabilise the emulsion. Preferably the emulsifier is anionic or non-ionic. Examples suitable anionic emulsifiers for the free oil perfume are alkylarylsulphonates, e.g., sodium dodecylbenzene sulphonate, alkyl sulphates e.g., sodium lauryl sulphate, alkyl ether sulphates, e.g., sodium lauryl ether sulphate nEO, where n is from 1 to 20 alkylphenol ether sulphates, e.g., octylphenol ether sulphate nEO where n is from 1 to 20, and sulphosuccinates, e.g., sodium dioctylsulphosuccinate. Examples of suitable nonionic surfactants used as emulsifiers for the free oil perfume are alkylphenol ethoxylates, e.g., nonylphenol ethoxylate nEO, where n is from 1 to 50, alcohol ethoxylates, e.g., lauryl alcohol nEO, where n is from 1 to 50, ester ethoxylates, e.g., polyoxyethylene monostearate where the number of oxyethylene units is from 1 to 30 and PEG-40 hydrogenated castor oil.

Malodour Ingredients

Fabric spray compositions of the present invention preferably comprise anti-malodour ingredient(s). Malodour ingredients maybe in addition to traditional free perfume ingredients.

Anti-malodour agent may be present at a level selected from: less than 20%, less than 10%, and less than 5%, by weight of the garment refreshing composition. Suitably anti-malodour agent is present in the garment refreshing composition in an amount selected from the range of from about 0.01% to about 5%, preferably from about 0.1% to about 3%, more preferably from about 0.5% to about 2%, by weight of the garment refreshing composition.

Any suitable anti-malodour agent may be used. Indeed, an anti-malodour effect may be achieved by any compound or product that is effective to "trap", "absorb" or "destroy" odour molecules to thereby separate or remove odour from the garment or act as a "malodour counteractant".

The odour control agent may be selected from the group consisting of: uncomplexed cyclodextrin; odour blockers; reactive aldehydes; flavanoids; zeolites; activated carbon; a mixture of zinc ricinoleate or a solution thereof and a substituted monocyclic organic compound; and mixtures thereof.

As noted above, a suitable anti-malodour agent is cyclodextrin, suitably water soluble uncomplexed cyclodextrin. Suitably cyclodextrin is present at a level selected from 0.01% to 5%, 0.1% to 4%, and 0.5% to 2% by weight of the garment refreshing composition.

As used herein, the term "cyclodextrin" includes any of the known cyclodextrins such as unsubstituted cyclodextrins containing from six to twelve glucose units, especially, alpha-cyclodextrin, beta-cyclodextrin, gamma-cyclodextrin and/or their derivatives and/or mixtures thereof. The alpha-cyclodextrin consists of six glucose units, the beta-cyclodextrin consists of seven glucose units, and the gamma-cyclodextrin consists of eight glucose units arranged in donut-shaped rings.

Preferably, the cyclodextrins are highly water-soluble such as, alpha-cyclodextrin and/or derivatives thereof, gamma-cyclodextrin and/or derivatives thereof, derivatised beta-cyclodextrins, and/or mixtures thereof. The derivatives of cyclodextrin consist mainly of molecules wherein some of the OH groups are converted to OR groups. Cyclodextrin derivatives include, e.g., those with short chain alkyl groups such as methylated cyclodextrins, and ethylated cyclodextrins, wherein R is a methyl or an ethyl group; those with hydroxyalkyl substituted groups, such as hydroxypropyl cyclodextrins and/or hydroxyethyl cyclodextrins, wherein R is a —CH2-CH(OH)—CH3 or a —CH2CH2-OH group; branched cyclodextrins such as maltose-bonded cyclodextrins; cationic cyclodextrins such as those containing 2-hydroxy-3-(dimethylamino)propyl ether, wherein R is CH2-CH(OH)—CH2-N(CH3)2 which is cationic at low pH; quaternary ammonium, e.g., 2-hydroxy-3-(trimethylammonio)propyl ether chloride groups, wherein R is CH2-CH(OH)—CH2-N+(CH3)3Cl—; anionic cyclodextrins such as carboxymethyl cyclodextrins, cyclodextrin sulfates, and cyclodextrin succinylates; amphoteric cyclodextrins such as carboxymethyl/quaternary ammonium cyclodextrins; cyclodextrins wherein at least one glucopyranose unit has a 3-6-anhydro-cyclomalto structure, e.g., the mono-3-6-anhydrocyclodextrinse Highly water-soluble cyclodextrins are those having water solubility of at least about 10 g in 100 ml of water at room temperature, preferably at least about 20 g in 100 ml of water, more preferably at least about 25 g in 100 ml of water at room temperature. The availability of solubilized, uncomplexed cyclodextrins is essential for effective and efficient odour control performance. Solubilized, water-soluble cyclodextrin can exhibit more efficient odour control performance than non-water-soluble cyclodextrin when deposited onto surfaces, especially fabric.

Examples of preferred water-soluble cyclodextrin derivatives suitable for use herein are hydroxypropyl alpha-cyclodextrin, methylated alpha-cyclodextrin, methylated beta-cyclodextrin, hydroxyethyl beta-cyclodextrin, and hydroxypropyl beta-cyclodextrin. Hydroxyalkyl cyclodextrin derivatives preferably have a degree of substitution of from about 1 to about 14, more preferably from about 1.5 to about 7, wherein the total number of OR groups per cyclodextrin is defined as the degree of substitution. Methylated cyclodextrin derivatives typically have a degree of substitution of from about 1 to about 18, preferably from about 3 to about 16. A known methylated beta-cyclodextrin is heptakis-2,6-di-O-methyl-8-cyclodextrin, commonly known as DIMEB, in which each glucose unit has about 2 methyl groups with a degree of substitution of about 14. A preferred, more commercially available, methylated beta-cyclodextrin is a randomly methylated beta-cyclodextrin, commonly known as RAMEB, having different degrees of substitution, normally of about 12.6. RAMEB is more preferred than DIMEB, since DIMEB affects the surface activity of the preferred surfactants more than RAMEB. The preferred cyclodextrins are available, e.g., from Cerestar U.S.A., Inc. and Wacker Chemicals (U.S.A.), Inc.

In embodiments mixtures of cyclodextrins are used.

"Odour blockers" can be used as an anti-malodour agent to mitigate the effects of malodours. Non-limiting examples of odour blockers include 4-cyclohexyl-4-methyl-2-pentanone, 4-ethylcyclohexyl methyl ketone, 4-isopropylcyclohexyl methyl ketone, cyclohexyl methyl ketone, 3-methylcyclohexyl methyl ketone, 4-tert.-butylcyclohexyl methyl ketone, 2-methyl-4-tert.butylcyclohexyl methyl ketone, 2-methyl-5-isopropylcyclohexyl methyl ketone, 4-methylcyclohexyl isopropyl ketone, 4-methylcyclohexyl secbutyl ketone, 4-methylcyclohexyl isobutyl ketone, 2,4-dimethylcyclohexyl methyl ketone, 2,3-dimethylcyclohexyl methyl ketone, 2,2-dimethylcyclohexyl methyl ketone, 3,3-dimethylcyclohexyl methyl ketone, 4,4-dimethylcyclohexyl methyl ketone, 3,3,5-trimethylcyclohexyl methyl ketone, 2,2,6-trimethylcyclohexyl methyl ketone, 1-cyclohexyl-1-ethyl formate, 1-cyclohexyl-1-ethyl acetate, 1-cyclohexyl-1-ethyl propionate, 1-cyclohexyl-1-ethyl isobutyrate, 1-cyclohexyl-1-ethyl n-butyrate, 1-cyclohexyl-1-propyl acetate, 1-cyclohexyl-1-propyl n-butyrate, 1-cyclohexyl-2-methyl-1-propyl acetate, 2-cyclohexyl-2-propyl acetate, 2-cyclohexyl-2-propyl propionate, 2-cyc10hexyl-2-propyl isobutyrate, 2-cyc10hexyl-2-propyl nbutyrate, 5,5-dimethyl-1,3-cyclohexanedione (dimedone), 2,2-dimethyl-1,3-dioxane-4,6-dione (Meldrum's acid), spiro-[4.5]-6,10-dioxa-7,9-dioxodecane, spiro-[5.5]-1,5-dioxa-2,4-dioxoundecane, 2,2-hydroxymethyl-1,3-dioxane-4,6-dione and 1,3-cyclohexadione. Odour blockers are disclosed in more detail in U.S. Pat. Nos. 4,009,253; 4,187,251; 4,719,105; 5,441,727; and 5,861,371, incorporated herein by reference.

Reactive aldehydes can be used as anti-malodour agent to mitigate the effects of malodours. Examples of suitable reactive aldehydes include Class I aldehydes and Class II aldehydes. Examples of Class I aldehydes include anisic aldehyde, o-allyl-vanillin, benzaldehyde, cuminic aldehyde, ethylaubepin, ethyl-vanillin, heliotropin, tolyl aldehyde, and vanillin. Examples of Class II aldehydes include 3-(4'-tert.butylphenyl)propanal, 2-methyl-3-(4'-tertbutylphenyl) propanal, 2-methyl-3-(4'-isopropylphenyl)propanal, 2,2-dimethyl-3-(4-ethylphenyl)propanal, cinnamic aldehyde, a-amyl-cinnamic aldehyde, and a-hexyl-cinnamic aldehyde. These reactive aldehydes are described in more detail in U.S. Pat. No. 5,676,163. Reactive aldehydes, when used, can include a combination of at least two aldehydes, with one aldehyde being selected from acyclic aliphatic aldehydes, non-terpenic aliphatic aldehydes, non-terpenic alicyclic aldehydes, terpenic aldehydes, aliphatic aldehydes substituted by an aromatic group and bifunctional aldehydes; and the second aldehyde being selected from aldehydes possessing an unsaturation alpha to the aldehyde function conjugated with an aromatic ring, and aldehydes in which the aldehyde group is on an aromatic ring. This combination of at least two aldehydes is described in more detail in WO 00/49120. As used herein, the term "reactive aldehydes" further encompasses deodourizing materials that are the reaction products of (i) an aldehyde with an alcohol, (ii) a ketone with an alcohol, or (iii) an aldehyde with the same or different aldehydes. Such deodourizing materials can be: (a) an acetal or hemiacetal produced by means of reacting an aldehyde with a carbinol; (b) a ketal or hemiketal produced by means of reacting a ketone with a carbinol; (c) a cyclic triacetal or a mixed cyclic triacetal of at least two aldehydes, or a mixture of any of these acetals, hemiacetals, ketals, hemiketals, or cyclic triacetals. These deodorizing perfume materials are described in more detail in WO 01/07095 incorporated herein by reference.

Flavanoids can also be used as anti-malodour agent. Flavanoids are compounds based on the C6-C3-C6 flavan skeleton. Flavanoids can be found in typical essential oils. Such oils include essential oil extracted by dry distillation from needle leaf trees and grasses such as cedar, Japanese cypress, eucalyptus, Japanese red pine, dandelion, low striped bamboo and cranesbill and can contain terpenic material such as alpha-pinene, beta-pinene, myrcene, phencone and camphene. Also included are extracts from tea leaf. Descriptions of such materials can be found in JP 02284997 and JP 04030855 incorporated herein by reference.

Metallic salts can also be used as anti-malodour agents for malodour control benefits. Examples include metal salts of fatty acids. Ricinoleic acid is a preferred fatty acid. Zinc salt is a preferred metal salt. The zinc salt of ricinoleic acid is especially preferred. A commercially available product is TEGO Sorb A30 ex Evonik. Further details of suitable metallic salts is provided below.

Zeolites can be used as anti-malodour agent. A useful class of zeolites is characterized as "intermediate" silicate/aluminate zeolites. The intermediate zeolites are characterized by SiO2/AlO2 molar ratios of less than about 10. Preferably the molar ratio of SiO2/AlO2 ranges from about 2 to about 10. The intermediate zeolites can have an advantage over the "high" zeolites. The intermediate zeolites have a higher affinity for amine-type odours, they are more weight efficient for odour absorption because they have a larger surface area, and they are more moisture tolerant and retain more of their odour absorbing capacity in water than the high zeolites. A wide variety of intermediate zeolites suitable for use herein are commercially available as Valfor® CP301-68, Valfor® 300-63, Valfor® CP300-35, and Valfor® CP300-56, available from PQ Corporation, and the CBV100® series of zeolites from Conteka. Zeolite materials marketed under the trade name Abscents® and Smellrite®, available from The Union Carbide Corporation and UOP are also preferred. Such materials are preferred over the intermediate zeolites for control of sulfur-containing odours, e.g., thiols, mercaptans. Suitably the zeolite material has a particle size of less than about 10 microns and is present in the garment refreshing composition at a level of less than about 1% by weight of the garment refreshing composition.

Activated carbon is another suitable anti-malodour agent. Suitable carbon material is a known absorbent for organic molecules and/or for air purification purposes. Often, such carbon material is referred to as “activated” carbon or “activated” charcoal. Such carbon is available from commercial sources under such trade names as; Calgon-Type CPG®; Type PCB®; Type SGL®; Type CAL®; and Type OL®. Suitably the activated carbon preferably has a particle size of less than about 10 microns and is present in the garment refreshing composition at a level of less than about 1% by weight of the garment refreshing composition.

Exemplar Anti-Malodour Agents are as Follows.

ODOBAN™ is manufactured and distributed by Clean Central Corp. of Warner Robins, Ga. Its active ingredient is alkyl (C14 50%, C12 40% and C16 10%) dimethyl benzyl ammonium chloride which is an antibacterial quaternary ammonium compound. The alkyl dimethyl benzyl ammonium chloride is in a solution with water and isopropanol. Another product by Clean Control Corp. is BIOODOUR CONTROL™ which includes water, bacterial spores, alkylphenol ethoxylate and propylene glycol.

ZEOCRYSTAL FRESH AIR MIST™ is manufactured and distributed by Zeo Crystal Corp. (a/k/a American Zeolite Corporation) of Crestwood, Ill. The liquid comprises chlorites, oxygen, sodium, carbonates and citrus extract, and may comprise zeolite. The odour control agent may comprise a “malodour counteractant” as described in US2005/0113282A1 by which is hereby incorporated by reference. In particular this malodour counteractant may comprise a mixture of zinc ricinoleate or a solution thereof and a substituted monocyclic organic compound as described at page 2, paragraph 17 whereby the substituted monocyclic organic compound is in the alternative or in combination one or more of:

1-cyclohexylethan-1-yl butyrate;

1-cyclohexylethan-1-yl acetate;

1-cyclohexylethan-1-ol;

1-(4'-methylethyl) cyclohexylethan-1-yl propionate; and

2'-hydroxy-1'-ethyl(2-phenoxy)acetate.

Synergistic combinations of malodour counteractants as disclosed at paragraphs 38-49 are suitable, for example, the compositions comprising:

(i) from about 10 to about 90 parts by weight of at least one substituted monocyclic organic compound-containing material which is:

(a) 1-cyclohexylethan-1-yl butyrate having the structure:

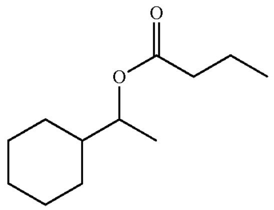

(b) 1-cyclohexylethan-1-yl acetate having the structure:

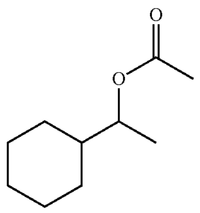

(c) 1-cyclohexylethan-1-ol having the structure:

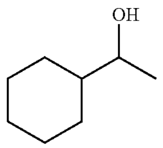

(d) 1-(4'-methylethyl)cyclohexylethan-1-yl propionate having the structure:

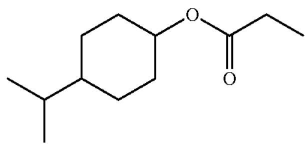

and (e) 2'-hydroxy-1'-ethyl(2-phenoxy)acetate having the structure:

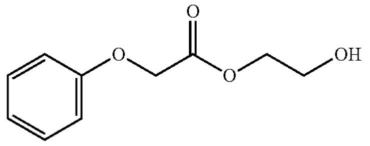 [SMILES: O=C(COc1ccccc1)OCCO]

and (ii) from about 90 to about 10 parts by weight of a zinc ricinoleate-containing composition which is zinc ricinoleate and/or solutions of zinc ricinoleate containing greater than about 30% by weight of zinc ricinoleate. Preferably, the aforementioned zinc ricinoleate-containing compositions are mixtures of about 50% by weight of zinc ricinoleate and about 50% by weight of at least one 1-hydroxy-2-ethoxyethyl ether of a More specifically, a preferred composition useful in combination with the zinc ricinoleate component is a mixture of:

(A) 1-cyclohexylethan-1-yl butyrate;

(B) 1-cyclohexylethan-1-yl acetate; and (C) 1-(4'-methylethyl)cyclohexylethan-1-yl propionate.

More preferably, the weight ratio of components of the immediately-aforementioned zinc riconoleate-containing mixture is one where the zinc ricinoleate-containing composition: 1-cyclohexylethan-1-yl butyrate: 1-cyclohexylethan-1-yl acetate: 1-(4'-methylethyl)-cyclohexylethan-1-yl propionate is about 2:1:1:1.

Another preferred composition useful in combination with the zinc ricinoleate component or solution is a mixture of:

(A) 1-cyclohexylethan-1-yl acetate; and (B) 1-(4'-methylethyl)cyclohexylethan-1-yl propionate.

More preferably, the weight ratio of components of the immediately-aforementioned zinc riconoleate mixture is one where the zinc ricinoleate-containing composition: 1-cyclohexylethan-1-yl acetate: 1-(4'-methylethyl)cyclohexylethan-1-yl propionate is about 3:1:1.

The anti-malodour materials of the present invention may be 'free' in the composition or they may be encapsulated. Suitable encapsulating material, may comprise, but are not limited to; aminoplasts, proteins, polyurethanes, polyacrylates, polymethacrylates, polysaccharides, polyamides, polyolefins, gums, silicones, lipids, modified cellulose, polyphosphate, polystyrene, polyesters or combinations thereof.

Particularly preferred encapsulating materials are aminoplasts, such as melamine formaldehyde or urea formaldehyde. The microcapsules of the present invention can be friable microcapsules and/or moisture activated microcapsules. By friable, it is meant that the perfume microcapsule will rupture when a force is exerted. By moisture activated, it is meant that the perfume is released in the presence of water.

To the extent any material described herein as an odour control agent might also be classified as another component described herein, for purposes of the present invention, such material shall be classified as an odour control agent.

Non-Ionic Surfactants

It is preferred that the fabric spray compositions of the present invention comprise a non-ionic surfactant. The non-ionic surfactant may provide stability benefits to the present invention.

Non-ionic surfactants are defined as surfactants comprising a hydrophobic group and a hydrophilic group.

Examples of non-ionic surfactants include: alcohol ethoxylates, alkyl phenol ethoxylates, fatty acid ethoxylates, monoalkaolamide ethoxylates, sorbitan ester ethoxylates, fatty amine ethoxylates, ethylene oxide-propylene oxide copolymers, glycol esters, glycerol and polyglycerol esters, glucosides and polyglucosides, and sucrose esters. An example of a suitable non-ionic surfactant is PEG-40 hydrogenated castor oil.

It is preferred that the non-ionic surfactant has an HLB value of 8-18. HLB is the Hydrophilic-lipophilic balance, calculated by Griffin's method. More preferably, the non-ionic surfactant has an HLB value of 13-18, most preferably 14-18.

Other Optional Ingredients

Other optional ingredients may be present in the fabric spray compositions of the present invention. For example, the fabric spray compositions may further comprise: colourants/dyes, preservatives, viscosity control agents, microcapsules comprising benefit agents, structurants/dispersants, solvents, antifoams for processing aid etc.

Spray Device

The compositions of the present invention are fabric spray compositions. By this is meant that the compositions are suitable for spraying onto a fabric. They may be sprayed by any suitable spraying device.

In one embodiment, the spray device is a hand-held, manually operable device, comprising a spray mechanism and a reservoir containing the fabric spray composition. The spray mechanism comprises a nozzle, the nozzle having a discharge orifice, from which the fabric spray composition is sprayed.

By manually operable spray device it is meant that the spray mechanism is manually operable to discharge a dose of said composition from the nozzle.

Preferably the spray device is operable without the use of a propellant. Indeed, propellant-free spray devices are preferred. This allows the spray to maintain the integrity and purity of the product, uncontaminated with propellant and is preferably environmentally.

Spray reservoirs may be non-pressurised, manually or mechanically pre-pressurised devices. The above also to removable/refillable reservoirs. Preferably the spray device is pressurised. This can improve spray duration and velocity. Preferably the spray device is pressurised by a gas chamber, separate from the reservoir containing the composition. The gas is preferably air or nitrogen. The spray device may comprise an outer container containing the composition and a pressurizing agent, wherein the composition is segregated from the pressurizing agent by containment (preferably hermetically sealed) in a flexible pouch. This which maintains complete formulation integrity so that only pure (i.e. excludes pressurising agent) composition is dispensed. Preferred systems are the so-called 'bag-in-can' (or BOV, bag-on-valve technology). Alternatively the spray device may comprise piston barrier mechanism, for example EarthSafe by Crown Holdings.

Preferably the spray device comprises a biodegradable plastic material.

Reservoir:

The reservoir as referred to here is, strictly, the container defining the reservoir. i.e. the container holding the fabric spray composition.

Spray Mechanism:

The spray mechanism may be operated by an actuator. The actuator can be a push actuator or a pull actuator. The actuator may comprise a trigger. The spray mechanism may comprise a hand-operable pump. Optionally, said pump is one of: a positive displacement pump; a self-priming pump; a reciprocating pump. Suitable spray devices include trigger sprays, continuous/semi-continuous sprays, finger pump sprays, vibrating mesh device output sprays, aerosol spray.

Preferably, the spray mechanism may comprise an atomiser configured to break up said liquid dose into droplets and thereby facilitate creation of said fine aerosol in the form of a mist. Conveniently, said atomiser may comprise at least one of: a swirl chamber and a lateral dispersion chamber. The atomiser functions to mix air with the garment refreshing composition.

Shroud:

The spray mechanism may preferably be housed in a shroud. i.e. a housing around the spray mechanism. A shroud comprised an outlet aperture, axially aligned with the nozzle of the spray mechanism, to allow the spray to pass through the shroud.

Spray Characteristics

The nozzle has a discharge orifice which is preferably configured to produce a spray having a wide cone angle, which facilitates even application of the fabric spray composition onto a garment. The wide cone angle coupled with the preferred droplet average diameter, prevents staining of the garment along with reduction of other consumer negatives, such as a feeling of 'coating' from the non-functionalised silicone. Preferably the spray has a cone angle of at least 50 degrees, preferably at least 55 degrees, more preferably at least 60 degrees. Preferably the spray has a cone angle of no more than 100 degrees, preferably no more than 90 degrees, more preferably no more than 80 degrees.

Preferably cone angles are selected from the range of 50 to 100 degrees, preferably 55 to 90 degrees, preferably 60 to 80 degrees.

Spray cone angle measurements are made by positioning a camera to the side of a spray device. The spray device is operated (e.g. the actuator is depressed) and an image is captured shortly after so as to record an image of the spray plume. The image is then analysed so as to identify the upper and lower boundaries of the spray plume and the image annotated with lines corresponding to these boundaries, the lines extending from the discharge orifice of the nozzle outwards along the boundaries. The cone angle is measured as the angle between the upper and lower boundary lines.

Preferably the spray comprises droplets having an average diameter of no more than 250 μm, preferably no more than 200 μm, preferably no more than 150 μm, preferably no more than 125 μm. Preferably the spray comprises droplets having an average diameter of at least 10 μm, preferably at least 20 μm, preferably at least 50 μm, preferably at least 80 μm. Suitably the spray comprises droplets having an average diameter in the range of 10 to 250 μm, suitably 20 to 200 μm, suitably 50 to 150 μm.

Average droplet size and droplet size distribution is measured using a Malvern Spraytec particle and spray droplet size measurement device (ex Malvern Instruments Ltd, UK). The size of spray droplets and spray particles are measured using laser diffraction. The intensity of light scattered as a laser beam passes through a spray is measured. This data is then analyzed by the measurement device to calculate the size of the droplets that created the scattering pattern. The spray device is positioned in the device holder so that the laser beam (1 cm diameter) crosses the centre of the spray plume about 15 cm from the nozzle discharge orifice. Measurements are made for a period of 5 seconds while repeatedly firing (actuating) the spray. This process is repeated 3 times. The average droplet size is taken to be the value of the peak/maximum of the plot of droplet diameter versus volume fraction. The parameter droplet size is the volume mean diameter, D[4,3].

Dose

When the spray packaging comprises a continuous spray mechanism, it is preferable that the spray mechanism is configured to spray 0.05 to 1 ml/sec. More preferably, 0.1 to 0.5 ml/sec, and most preferably 0.15 to 0.35 ml/sec.

When the spray packaging comprises a pump action spray, it is preferable that the spray mechanism is configured to discharge 0.05 to 1 g of fabric spray composition per spray. More preferably, 0.1 to 0.5 g of fabric spray composition per spray and most preferably 0.15 to 0.35 g fabric spray composition per spray.

Preferably, in the application of the fabric spray composition, 0.2 to 3 g of product is applied to an item of clothing. More preferably, 0.4 to 2 g per item of clothing, most preferably, 0.5 to 1.75 g of fabric spray composition is applied to the item of clothing.

Replacement Reservoir

According to a further aspect of the present invention, there is provided a replacement reservoir for a fabric spray product according to the above aspect(s), the replacement reservoir being pre-filled with a volume of said garment refreshing composition for replenishment of said product. A suitable "refill kit" comprises one or more reservoirs. In the case of more than one reservoir, for example two, three, four, five, or more reservoirs, the contents (aqueous fabric spray composition) of each reservoir may the same as or different from the other reservoirs.

Methods of Use

In one aspect of the present invention, there is provided a method of rejuvenating clothes or refreshing clothes. Rejuvenating clothes or refreshing clothes is assessed by look, feel and smell of the fabric. In particular, the fabric sprays of the present invention make clothes feel more smooth and silky. This in turn makes the fabric feel newer.

The method according to the present invention comprises the step of spraying the composition or fabric spray product of the present invention onto a garment.

Use of the Composition

In one aspect of the present invention, there is provided a use of the composition and spray product according to the present invention. The composition may be used to rejuvenating clothes or refresh clothes.

By rejuvenate or refresh it is meant that the composition may be used to make the treated garment look and feel younger or newer. This includes restoring the garments to the look and feel of a newly purchased state, which may include: less faded colours or a thicker feel or split fibre protection or sticking down of fibrils etc. in particular shape restoration or making feel smoother or silkier.

DRAWINGS

So that the invention may be more readily understood, and so that further features thereof may be appreciated, embodiments of the invention will now be described by way of example with reference to the accompanying drawings.

RESERVOIR/CONTAINER

Figure 1:
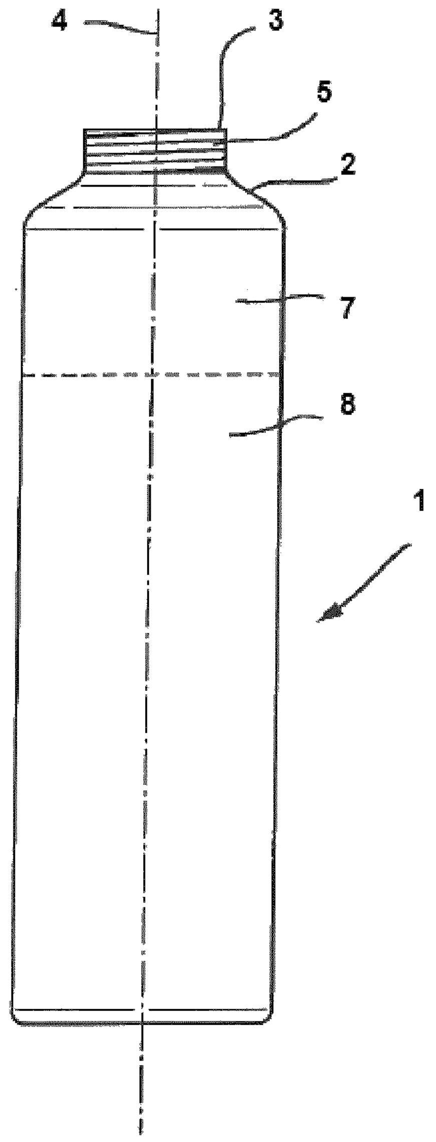
FIG. 1 is a side elevational view showing a liquid reservoir of the product illustrated in FIG. 1, with spray mechanism of the product removed.

FIG. 1, an exemplary reservoir-defining container 1. The particular configuration of container 1 as illustrated is provided in the form of an elongate and generally straight-sided cylindrical bottle, having an inwardly tapered upper shoulder region 2 which narrows to define an upstanding annular lip 3 at the uppermost end of the container and which is centred on the longitudinal axis 4 of the container. The lip 3 is shown to have an external screw thread 5 to facilitate releasable engagement between the container 1 and the spray mechanism 6. As will become apparent, however, other forms of releasable engagement between the container 1 and the spray mechanism bare possible.

As will be appreciated, the reservoir-defining container 1 defines an internal volume 7 for the receipt of a fabric spray composition 8. It is proposed that the product will be provided to an end user in an initial pre-filled condition, in which the reservoir will already be substantially filled with an appropriate volume of the fabric spray composition 8.

It is envisaged that in some embodiments the container 1 will be moulded from a suitable plastic material of a type known for use in the consumer products field. However, it is also possible for the container 1 to be formed from, or at least to comprise, glass.

It is also to be appreciated that whilst the fabric spray composition-containing reservoir of the embodiments disclosed herein is defined by the container 1 itself, other variants are envisaged in which the reservoir might be provided as a separate vessel containing the fabric spray composition 8, the vessel simply being housed and supported within the container 1, for example the bag on valve technology.

Fabric Spray Composition

Example fabric spray compositions are provided in Example 1, table 1.

Spray Mechanism

Figure 2:
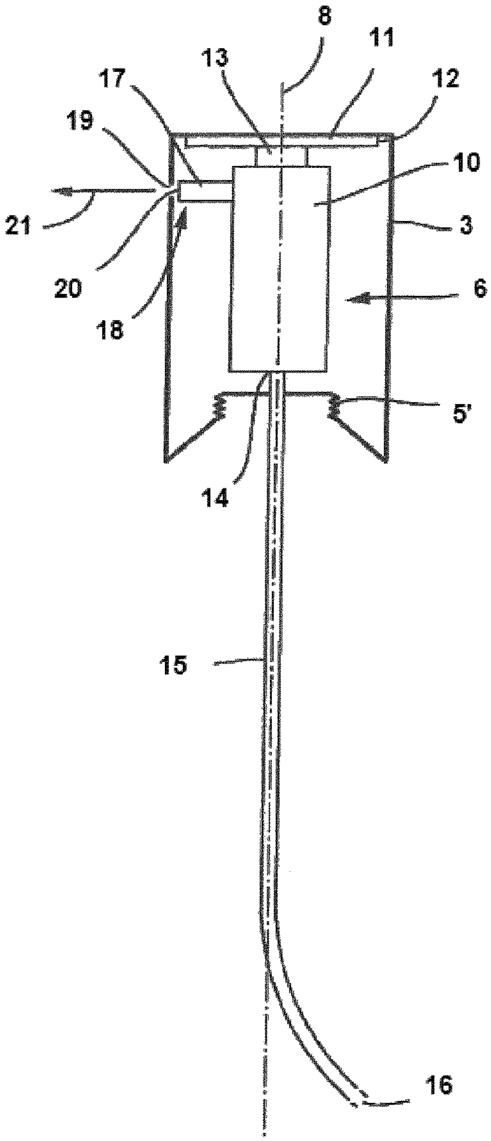
FIG. 2 is a schematic part-sectional view showing a spray mechanism of the product.

Aspects of the spray mechanism 6 are illustrated schematically in more detail in FIG. 2. In this particular configuration of the spray mechanism 6 is housed within a shroud 9. And may be screwed onto container 1, by means of reciprocal screw thread 5', which engages with screw treat 5 on container 1.

As will become apparent, the spray mechanism 6 is configured for manual operation, by hand, by a user of the product, and comprises a spray mechanism such that it is operable without the use of a pressurized propellant of the sort used in so-called "aerosol sprays". The spray mechanism 6 may thus comprise a hand-operable pump 10, which may take any convenient form such as, for example, a positive displacement pump, a self-priming pump, or a reciprocating pump. The pump 10 is mechanically connected to an actuator, which in the particular arrangement illustrated in FIG. 2 takes the form of a push-button 17 which is accommodated within an aperture 12 provided through the upper end of the shroud 9, for convenient actuation by a user's finger whilst holding the product. The push-button 11 is shown mounted to the end of a plunger 13 which extends into an internal housing of the pump 10 and which actuates the pump 10 when driven downwardly via operation of the push-button 11.

An inlet 14 of the pump 10 is shown connected to an inlet pipe 15, which may take the form of a length of flexible tubing. As will be appreciated, when the shroud 9 and its associated spray mechanism 6 are mounted to the container 1, the inlet pipe ("dip tube") 15 will extend downwardly from the mechanism and will terminate with its open end 16 located at the bottom of the fabric spray composition reservoir defined by the container 1. The inlet pipe 15 thus facilitates the draw-up of fabric spray composition 8 from the reservoir upon operation of the spray mechanism 6.

The spray mechanism 6 also comprises a nozzle 17 which is fluidly connected to an outlet of the pump 10, and which is substantially completely enclosed within the shroud 9 so as to terminate at a discharge end 18 which located adjacent, and is substantially aligned with, the outlet aperture 19 of the shroud 9. A small discharge orifice 20 is formed in the nozzle 17 and is configured to direct an aerosol in the form of a fine mist of the fabric spray composition 8 outwardly through the outlet aperture 19 in the spray direction 21, upon operation of the spray mechanism 6. As will be noted, the spray direction 21 is preferably substantially orthogonal to the respective longitudinal axes 4, of the container 1, so as to be easily directed towards a fabric garment or the like by a user of the product 1.

In order to ensure the creation of an appropriately fine mist of the fabric spray composition 8, the spray mechanism 6 may comprise an atomiser. The atomiser will be configured to break up a dose of the liquid drawn through the inlet tube 15, into a large number of small droplets and will thereby create the desired fine mist of the fabric spray composition 8 for discharge from the product. It is envisaged that in some embodiments the atomiser will be provided as an integral feature of the nozzle 17. The atomiser may comprise a swirl chamber and/or a lateral dispersion chamber.

Figure 3:
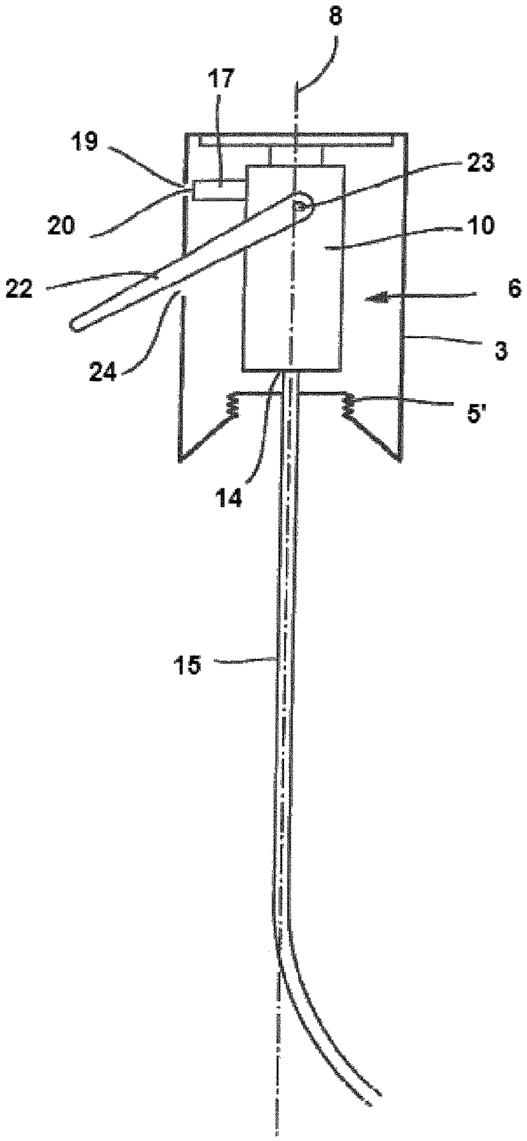
FIG. 3 is a schematic part-sectional view, generally similar to that of FIG. 2, but which shows an alternative configuration of spray mechanism.

FIG. 3 illustrates a slightly modified version of the spray mechanism 6 illustrated in FIG. 2. The version illustrated in FIG. 3 shares many aspects of the version illustrated in FIG. 2, and so identical or equivalent components are identified by the same reference numbers and will not be described in detail again. However, the alternative configuration illustrated in FIG. 3, does not have a spray mechanism actuator in the form of a push-button, but instead has an actuator in the form of a finger-operable trigger or lever 22. As will be noted, the trigger or lever 22 is mounted relative to the pump 10 via a pivotal connection 23, such that the trigger or lever is operable via pivotal movement to actuate the pump 10. The trigger or lever 22 protrudes from the spray mechanism 6, passes through an elongate slot 24 formed in the sidewall of the shroud 9 (and optionally below the outlet aperture 19), and terminates in a free end which is spaced from the shroud 9. The slot 24 is sized so as to accommodate the pivotal range of movement of the trigger or lever 22 when actuated.

Figure 4:
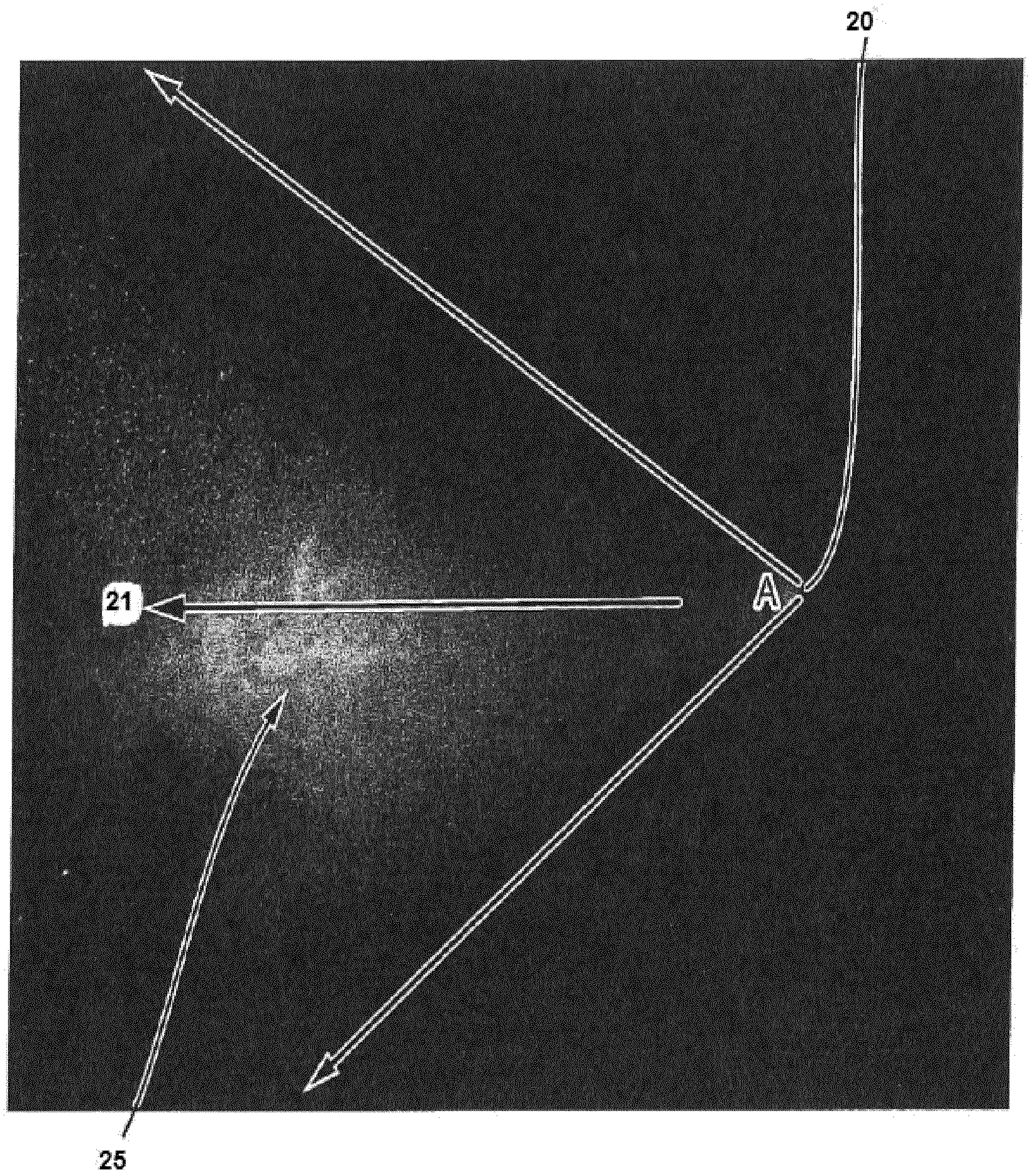
FIG. 4 is a side elevational view showing an exemplary fine mist spray, which may be produced by the product.

As will be appreciated, upon actuation of the pump 10, either via the push-button 11 in the case of the FIG. 2 arrangement, or via the trigger or lever 22 of the FIG. 3 arrangement, the pump 10 will draw a dose of the fabric spray composition 8 from the reservoir, whereupon the atomiser will atomise the dose. The atomised dose will then be discharged through the discharge orifice 20 as an aerosol in the form of a fine mist 25, as illustrated in FIG. 4. As already indicated, the mist 25 will be discharged in a spray-direction 21 which is substantially orthogonal to the longitudinal axis 4 of the container 1. It is considered advantageous for the discharge orifice 20 of the nozzle 17 to be configured to produce the fine mist 25 in a substantially circular cone pattern, and in a spray having a cone angle A in the range of 50 to 100 degrees. A spray pattern of this type has been found to provide very good coverage when the product is used to spray the fabric spray composition 8 onto a garment or the like, without the creation of localised areas of staining. More particularly, nozzle 17 and its associated atomiser may be configured in some embodiments to generate droplets within the mist 25 having an average diameter of in the range of 20 to 200 μm.

In some embodiments, it is envisaged that the spray mechanism 6 will be configured to draw a dose of the fabric spray composition 8 having a volume of between 0.05 to 1 g upon each actuation, for atomisation and discharge in the form of the fine mist 25. In the case that the spray mechanism 6 is a continuous spray mechanism, a spray rate of 0.05 to 1 ml/sec is preferred.

In FIGS. 2 and 3, the spray mechanism is housed by the shroud 5. In alternative embodiments, the shroud can be absent.

Spray Cone Angle

FIG. 4 demonstrates that calculation of the spray cone angle. Spray cone angle measurements are made by positioning a camera to the side of a spray device. The spray device is operated (e.g. the actuator is depressed) and an image is captured shortly after so as to record an image of the spray plume. The image is then analysed so as to identify the upper and lower boundaries of the spray plume and the image annotated with lines corresponding to these boundaries, the lines extending from the discharge orifice of the nozzle outwards along the boundaries. The cone angle A is measured as the angle between the upper and lower lines, as shown in FIG. 4.

Droplet Size

Figure 5:
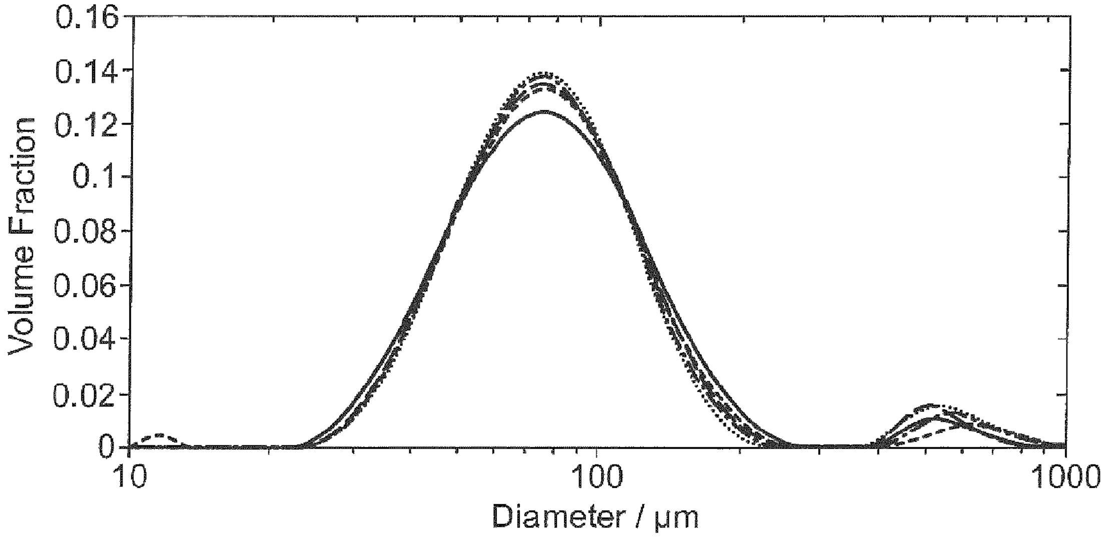
FIG. 5 shows droplet size distribution plots acquired from measurements on a Malvern Spraytec instrument, with the peak maximum corresponding to the average droplet size.

An example of droplet size measurement results is shown in FIG. 5. The data was acquired using a Malvern Spraytec instrument as discussed herein. The average droplet size is the peak maximum on the droplet diameter-volume fraction plot, in this case being about 75 μm.

Average droplet size and droplet size distribution is measured using a Malvern Spraytec particle and spray droplet size measurement device (ex Malvern Instruments Ltd, UK). The size of spray droplets and spray particles are measured using laser diffraction. The intensity of light scattered as a laser beam passes through a spray is measured. This data is then analyzed by the measurement device to calculate the size of the droplets that created the scattering pattern. The spray device is positioned in the device holder so that the laser beam (1 cm diameter) crosses the centre of the spray plume about 15 cm from the nozzle discharge orifice.

Measurements are made for a period of 5 seconds while repeatedly firing (actuating) the spray. This process is repeated 3 times.

Example 1

TABLE 1

Spray Compositions according to the present invention

| Ingredient | Spray Composition 1 (w.t. % of active ingredient) | Spray Composition 2 (w.t. % of active ingredient) | Spray Composition 3 (w.t. % of active ingredient) |
|---|---|---|---|
| PDMS (pre emulsified) [1] | 0.5 | 1.0 | 1.5 |
| Free oil perfume [2] | 0.34 | 0.34 | 0.34 |
| Malodour counteractant | 0.2 | 0.2 | 0.2 |
| PEG-40 hydrogenated caster oil (non-ionic surfactant) [3] | 0.8 | 0.8 | 0.8 |
| Minors and water | To 100 | To 100 | To 100 |

[1] emulsion droplet size less than 160 nm
[2] in the form of an emulsion, emulsion droplet size according to the invention
[3] HLB 15

Method of Manufacture:

A vessel was charged with water and maintained at 20° C.±5° C. To the vessel was added the silicone emulsion and minors, with stirring. A pre-mix was produced by blending melted non-ionic surfactant (45° C.) with the free oil perfume and anti-malodour technology whilst keeping this blend at 45° C. The premix was then added to the vessel with mixing.

Test Protocol:

20×20 squares of knitted cotton and woven cotton fabric were prepared.

The cloths were washed on a 40° C. cotton cycle with a non-bio detergent and 35 mls of fabric conditioner (UK Comfort®).

The cloths were lined dried for 24 hours.

One set of cloths were left un-sprayed and used as a control.

Each cloth was sprayed with one of the Compositions 1-3. The cloths were sprayed while hanging on a clothes maiden. Cloths were sprayed from a distance of 5 inches, with 3 squirts of the composition being sprayed onto each cloth. This resulted in ~0.7 g of the composition being administered to each cloth. The clothes were lined dried for a further 24 hours.

Panel Test:

14 participants took part in the panel test. Over the panel test, they were presented with 12 different cloths: three untreated, three treated with spray composition 1, three treated with spray composition 2, three treated with spray composition 3). Cloths were presented in a random order and the participants asked to asked to score each on different features: Smoothness, Roughness, Coated feeling, Stiffness and Silkiness, on a scale of 1 to 10. The scores were recorded and an average of all scores calculated.

TABLE 2

Scores for Woven Cotton

| | Average Score | | | | |
|---|---|---|---|---|---|
| | Smooth | Rough | Coated | Stiff | Silky |
| No Spray | 2.63 | 4.13 | 0.76 | 5.06 | 0.59 |
| Spray Composition 1 (0.5%) | 3.1 | 3.45 | 0.69 | 4.23 | 0.69 |
| Spray Composition 2 (0.5%) | 3.53 | 3.38 | 0.73 | 4.17 | 0.85 |
| Spray Composition 3 (0.5%) | 3.12 | 3.29 | 0.8 | 4.21 | 0.96 |

TABLE 3

Scores for Knitted Cotton

| | Average Score | | | | |
|---|---|---|---|---|---|
| | Smooth | Rough | Coated | Stiff | Silky |
| No Spray | 5.5 | 1.53 | 1.29 | 0.99 | 1.48 |
| Spray Composition 1 (0.5%) | 5.64 | 1.65 | 1.26 | 0.86 | 1.27 |
| Spray Composition 2 (0.5%) | 5.71 | 1.43 | 1.34 | 0.66 | 1.36 |
| Spray Composition 3 (0.5%) | 5.87 | 1.26 | 1.45 | 0.58 | 1.59 |

Smooth—Both materials increase in smoothness as % of PDMS increases

Rough—Both materials decrease in roughness as % of PDMS increases

Stiff—Both materials show decreasing stiffness as % of PDMS increases

Silky—Knitted cotton shows 1.5% as most silky, woven cotton shows increasing silkiness as PDMS levels increase.

The results demonstrate that on two different types of materials, having different initial properties, that from 0.5 to 1.5% the fabric becomes smoother, less rough, less stiff and silkier. However, as these positive characteristics increase the negative feeling of 'coated' also increases. The range of 0.5 to 2% demonstrates an improvement in the fabric properties, within a consumer acceptable level of 'coated' feeling.

The invention claimed is:

1. A fabric spray composition comprising:

0.5 to 2 w.t. % non-functionalized silicone, wherein the silicone is in the form of an emulsion and the emulsion has a particle size of 1 nm to 300 nm;

free perfume having a particle size of 1 nm to 30 μm, wherein the fabric spray composition is aqueous; and PEG-40 hydrogenated castor oil.

2. The fabric spray composition according to claim 1, wherein the non-functionalized silicone is a polydimethylsiloxane polymer.

3. The fabric spray composition according to claim 1, wherein the fabric spray composition further comprises a malodour ingredient.

4. The fabric spray composition according to claim 1, wherein the PEG-40 hydrogenated castor oil has a hydrophilic-lipophilic balance (HLB) value of 8-18.

5. A fabric spray product comprising:

an aqueous fabric spray composition, the fabric spray composition comprising 0.5 to 2 w.t. % non-functionalized silicone in the form of an emulsion with a particle size of 1 nm to 300 nm and PEG-40 hydrogenated castor oil; and a hand-held spray device, which is manually operable to produce a spray of the fabric spray composition, the hand-held spray device comprising:

a reservoir containing the fabric spray composition and;

a spray mechanism, the spray mechanism being manually operable to discharge the fabric spray composition wherein said spray mechanism comprises a nozzle, the nozzle having a discharge orifice which is configured to produce a spray having a cone angle in the range of 50 to 100 degrees and/or a spray which comprises droplets having an average diameter in the range of 20 to 200 μm.

6. The fabric spray product according to claim 5, wherein the fabric spray composition further comprises 0.0001 to 10 w.t. % free perfume.

7. The fabric spray product according to claim 6, wherein the free perfume has an emulsion particle size of 1 nm to 30 μm.

8. The fabric spray product according to claim 5, wherein the non-functionalized silicone is a polydimethylsiloxane polymer.

9. The fabric spray product according to claim 5, wherein the fabric spray composition further comprises a malodour ingredient.

10. The fabric spray product according to claim 5, wherein the PEG-40 hydrogenated castor oil has a hydrophilic-lipophilic balance (HLB) value of 8-18.

11. A method of refreshing fabric, comprising:

spraying an aqueous fabric spray composition onto fabric or clothes, wherein the aqueous fabric spray composition comprises:

0.5 to 2 w.t. % non-functionalized silicone, wherein the silicone is in the form of an emulsion and the emulsion has a particle size of 1 nm to 300 nm;

free perfume having a particle size of 1 nm to 30 μm; and

PEG-40 hydrogenated castor oil.

* * * * *